United States Patent Office 3,437,822
Patented Apr. 8, 1969

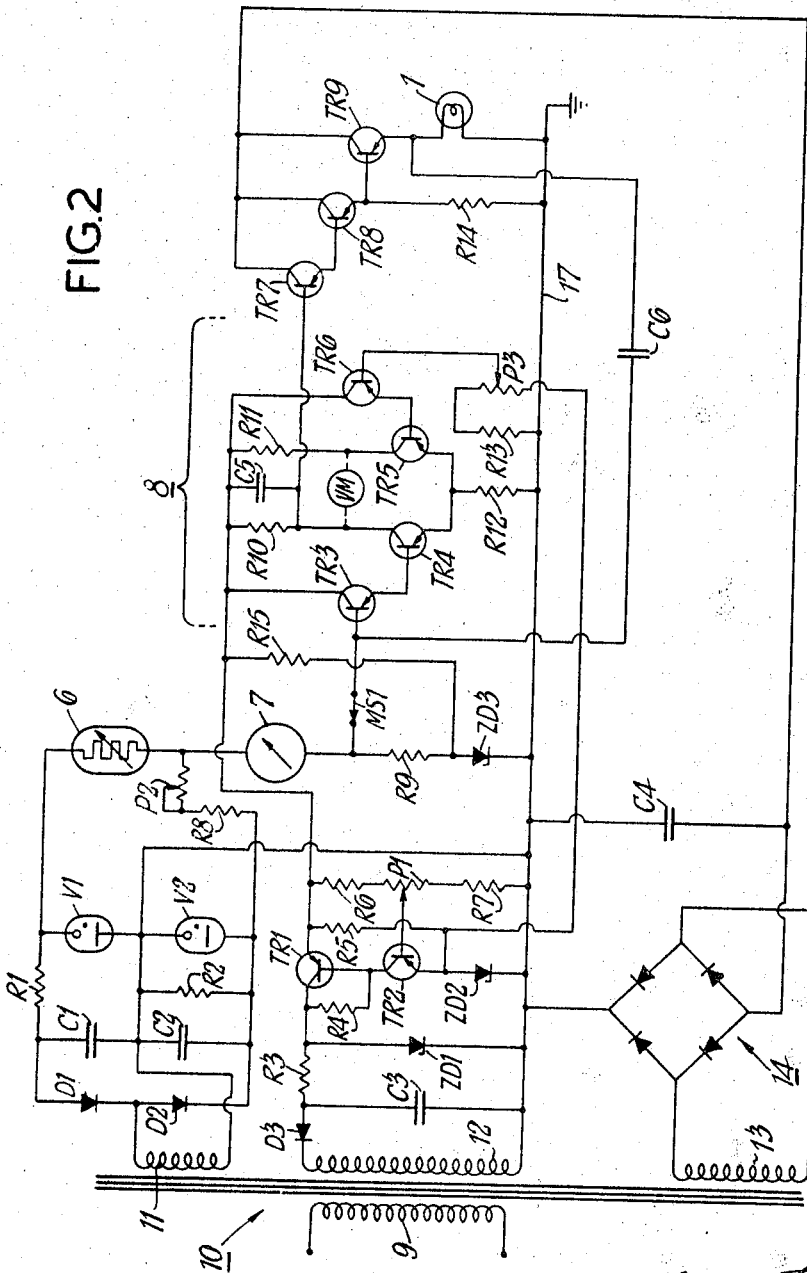

3,437,822
METHOD AND APPARATUS FOR MEASURING RADIATION ABSORPTION EMPLOYING A FEEDBACK AMPLIFIER TO CONTROL THE LAMP SUPPLY
Alan Edward Fitzsimmons, Sutton, England, assignor to Vickers Limited, London, England, a British company
Filed Apr. 12, 1966, Ser. No. 542,149
Claims priority, application Great Britain, May 3, 1965, 18,606/65
Int. Cl. G01n 21/26
U.S. Cl. 250—218                                           20 Claims This invention relates to measurement of the absorption of radiation by a substance.

According to one aspect of the invention there is provided a radiation-absorption measuring device comprising a radiation source for supplying radiation to a sample of a substance to be investigated, a radiation-sensitive member for receiving radiation transmitted through a sample from the source and connected for providing an electric current dependent upon the intensity of such transmitted radiation, and means operative selectively between a first condition, in which the said means operates to stabilize the magnitude of such electric current by controlling the radiation source in dependence thereupon, and a second condition in which the said means operates to stabilize the radiation source output power in dependence upon that value of the source output power which obtained when the said means was last operating in the said first condition, the source output power when the said means is operating in its second condition being independent of such electric current.

According to a second aspect of the invention there is provided a radiation-absorption method of testing the content of a given material in a transparent matrix, comprising the steps of interposing between a radiation source and a radiation-sensitive member, which is connected for providing an electric current depending upon the intensity of radiation received by the member from the source, a standard radiation-absorption device, while stabilizing the said electric current by controlling the radiation source in dependence thereupon, and then replacing the standard device between the radiation source and the said member by a sample of the matrix having an unknown material content which is to be tested, rendering the radiation source output power independent of the said electric current, stabilizing the source output power in dependence upon that value of the source output power which obtained when the radiation source was last being controlled in dependence upon the electric current, and using the said electric current to provide a response which is a measure of the said unknown content.

For a better understanding of the invention, and to show how the same may be carried into effect, reference will now be made, by way of example, to the accompanying drawings in which:

FIGURE 2 shows a circuit diagram of parts of the device.

Figure 1:
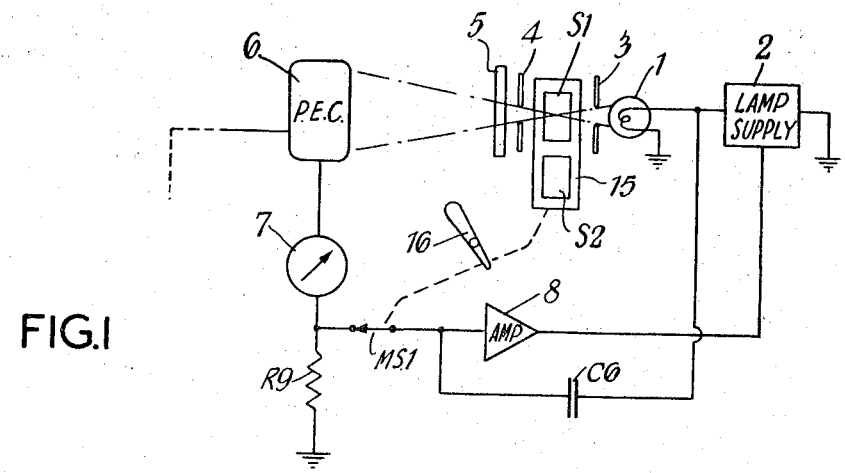
FIGURE 1 is a schematic diagram of a radiation-absorption measuring device.

The particular device illustrated in the drawings is a haemoglobinometer, although the principles of the device are applicable to colorimetric absorption-measuring apparatus in general. It comprises, with reference to FIGURE 1, an electric lamp 1 which is energised by means of an electrical supply circuit 2, an optical system which comprises two apertured diaphragms 3 and 4, a green filter 5 (marketed in Great Britain as an "Ilford 625" filter) for passing mercury green light, a photo-electric cell 6, a meter 7, connected to give a reading depending on electric current passing through the photo-electric cell 6, and a resistor R9 connected in series with the photo-electric cell 6 and the meter 7. It will be appreciated that only a part of the cell current circuit is shown in FIGURE 1. Further, it will be appreciated that the meter 7 will give a visual indication of the magnitude of the electric current passing through it, which electric current is, by virtue of the action of the cell 6, provided in dependence upon the intensity of the transmitted radiation received by the cell.

A micro-switch MS1 is shown connected to apply a voltage signal produced across R9, by the passage of the cell current therethrough, to the input of a D.C. amplifier 8 the output of which is connected to control the lamp supply 2. A capacitor C6 is connected between the output of the lamp supply 2 and the input to the amplifier 8.

A slidable carrier 15 is arranged to carry two samples S1 and S2 between the apertures of the diaphragms 3 and 4. The carrier is movable by means of a lever device 16 which is linked also with the micro-switch MS1. With the lever device in a first position the carrier 15 is in such a disposition that the sample S1 is interposed in the light path defined between the respective apertures of the diaphragms 3 and 4, so that light from the lamp 1 must be transmitted by the sample before being received by the cell 6, and the micro-switch MS1 is closed as illustrated. The lever device and its linkage with the carrier 15 and the micro-switch MS1 are such that movement of the lever device from its first position will first cause the micro-switch MS1 to open and will then cause movement of the carrier 15 to a second disposition in which the sample S2 is interposed in the light path, between the diaphragms 3 and 4, in place of the sample S1. On returning the lever device to its first position, so as to replace the sample S1 in the light path, the micro-switch MS1 will be closed again.

The photo-electric cell 6 is a photo-conductive cadmium sulphide cell having a sensitivity sufficiently high that the meter 7 can be of a robust type (1.0 ma. movement). The spectral response of this photo-electric cell peaks in the red but maintains 80% response in the green, so it is very suitable for the measurement of the haemoglobin content of a blood sample, in which measurement the absorption, by the sample, of mercury green light is investigated.

The haemoglobinometer also includes a power supply (not shown in FIGURE 1) for supplying a stabilized working voltage for the photo-electric cell, and means (not shown in FIGURE 1) are provided whereby a variable stabilized backing-off voltage can be applied to the meter, in opposition to the voltage applied thereto by the aforesaid power supply in the photo-electric cell circuit, for adjusting the value of the electric current through the meter 7 under any given conditions.

The haemoglobinometer may be calibrated as follows:

The sample S1 is a standard solution, equivalent to five grammes of haemoglobin per 100 ml. of blood, contained in a colorimeter test tube or a cuvette (an optically worked glass container providing a light path of 1 cm.), and the sample S2 is a standard solution equivalent to 20 grammes of haemoglobin in 100 ml. of blood and is contained in an identical test tube or cuvette.

With S1 in position, as illustrated, the circuit is adjusted (as explained hereinafter) so that full scale deflection of the meter 7 is obtained, this being calibrated as 5 gm. per 100 ml. (5 g. percent). Feed-back of that voltage signal which is developed across R9, through the amplifier 8 to the lamp supply 2, serves to control the brightness of the lamp 1 in such a manner that the electric current through the meter 7, and therefore the reading of the meter 7, is stabilized under these conditions. The arrangement thus provides automatic correction for drift of the "zero" reading (full scale deflection)

while the standard 5 g. percent sample S1 is in the light path between the diaphragms 3 and 4.

Full scale deflection of the meter may alternatively be calibrated in this way in terms of the well-known haldene scale.

The lever device 16 is now operated so as to open the switch MS1 and move the 20 g. percent sample S2 into the light path. Movement of the carrier is in fact delayed until the switch MS1 has opened. Under the new circumstances the input to the amplifier 8 is held substantially constant by virtue of the voltage across the capacitor C6, so that the lamp voltage will be independent of any subsequent change in the electric current through R9. Thus the radiation source output power is then stabilized in dependence upon that last value of the source output power which obtained immediately before the switch MS1 was opened. With the 20 g. percent standard in position thus, the backing-off voltage is now adjusted so that the meter 7 gives zero reflection, this point being calibrated as 20 g. percent.

Depending on whether it is desired to investigate the content of oxyhaemoglobin or cyanmethaemoglobin, the appropriate standard solutions should be used as the samples S1 and S2.

It will be appreciated in the light of the foregoing explanation that when MS1 is closed the amplifier 8 acts as a straightforward D.C. amplifier in a closed loop system, with the result that the current through R9 tends to be held constant at a predetermined level. When MS1 is opened the combination of the capacitor C6 and the amplifier 8 act to hold the lamp supply voltage substantially constant at the level which obtained at the instant immediately before MS1 was opened.

In subsequent use of the haemoglobinometer the 5 g. percent standard is maintained in S1 and the sample S2 is the sample which is to be investigated. After each measurement on the haemoglobin content of an unknown sample S2 the carrier is moved to bring the standard sample S1 back into the light path, and to close the switch MS1, so as to correct automatically for any drift of the zero reading. Such drift may be due to many factors, e.g. variation of supply voltages and blackening of lamp glass.

The electrical circuitry will now be described in more detail with reference to FIGURE 2, in which can be seen the lamp 1 (a 6 volt, 0.5 amp. lamp), the photoelectric cell 6, the meter 7, the micro-switch MS1, the resistor R9 and the capacitor C6 (200 μf.) of FIGURE 1, R9 being a 1KΩ high stability resistor. When in operation, the device is supplied with power from the main via the primary winding 9 of a transformer 10 which has three secondary windings 11, 12, and 13.

The lamp supply comprises a full-wave bridge rectifier arrangement 14, which is fed from the secondary winding 13, and a compound emitter-follower arrangement of three transistors TR7, TR8 and TR9, the lamp 1 being connected as the emitter load of the transistor TR9. A smoothing capacitor C4 is connected across the output from the bridge rectifier 14. The bridge rectifier 14 supplies a collector voltage of −7 v. (relative to a reference voltage line 17) to the three transistors and, since the emitter current of TR9 is inherently insensitive to collector voltage change in such an arrangement, it is not necessary to provide additional stabilization for the output voltage from the bridge rectifier 14.

The D.C. amplifier 8 is a balanced arrangement comprising transistors TR3, TR4, TR5 and TR6, the input to the amplifier being supplied via MS1 to the base of TR3, to which base is also connected one side of the capacitor C6 the other side of which is connected to the emitter of TR9. The output from the amplifier is taken from the collector of TR4, to which collector is connected also a collector load resistor R10 and a capacitor C5 which acts as a bypass capacitor to prevent oscillations. The output from the amplifier 8 is connected to the base of TR7 to control the current supplied to the lamp 1. An input to the other side of the balanced arrangement, i.e. an input to the base of TR6, is supplied by means of a resistor R13 and a potentiometer P3 which are connected across a −5 v. reference potential provided by means of a Zener diode ZD2. A resistor R12 connected in the emitter circuits of TR4 and TR5 provides temperature compensation for the D.C. amplifier, and the reason for using the balanced circuit arrangement, as opposed to an non-balanced arrangement, is to balance out as for as is practicable any negative feed-back of the input signal which might otherwise be caused by the presence of R12. TR5 is provided with a collector load resistor R11, which has the same resistance value as R10.

The working voltages (in the range −8 v. to −10 v.) for the transistors TR3, TR4, TR5 and TR6 are provided by means of a power supply comprising a diode D3 connected to the secondary winding 12 of the transformer 10. This power supply includes also a smoothing capacitor C3 and a resistor R3, and is stabilized by means of a Zener diode ZD1 and a conventional series-shunt stabilizer including transistors TR1 and TR2. An adjustable input to the base of TR2 is available from a potentiometer P1 connected between two resistors R6 and R7 across the output from this power supply. The collectors of TR1 and TR2 are interconnected through a resistor R4. A resistor R5 serves to supply the standing operating current for the Zener diode ZD2.

A Zener diode ZD3, in series with the resistor R9, serves to provide an operating bias for the base of transistor TR3, and the standing operating current for the diode ZD3 is supplied through a resistor R15.

It will be appreciated that thermionic amplifier tubes could be substituted in known manner for the above-mentioned transistors, with appropriate changes in the working voltages provided.

A power supply for the series circuit including the photo-electric cell 6, the meter 7 and the resistor R9 comprises a diode D1 connected to the secondary winding 11 of the transformer 10. This supply circuit includes also a smoothing capacitor C1 and a resistor R1 and is stabilized by means of a gas-filled diode V1.

The aforementioned adjustable backing-off voltage is derived also from the secondary winding 11 by means of a diode D2, a smoothing capacitor C2, a resistor R2, a stabilizing gas-filled diode V2, a resistor R8 and a rheostat P2. The voltages across V1 and V2 are substantially equal.

The haemoglobinometer may be set up initially by the following procedures:

(a) The potentiometer P3 is adjusted, with the 5 g. percent standard S1 in the light path as shown in FIGURE 1, to bring the D.C. amplifier 8 to balance by equalising the voltages at the respective collectors of TR4 and TR5, a high resistance volt-meter VM (see FIGURE 2) being connected temporarily between these two collectors to indicate the balance. The supply voltage to these transistors, and therefore also the lamp voltage, is then adjusted by means of the potentiometer P1 so that the meter gives full scale deflection, P3 being adjusted also, if necessary, to keep the D.C. amplifier in balance.

(b) Having operated the lever device 16 to bring a 20 g. percent standard S2 into the light path, thus opening the micro-switch MS1, the backing-off voltage is adjusted by means of the rheostat P2 to give zero meter deflection. The 5 g. percent standard S1 is now returned into the light path, thus closing MS1, whereupon the brightness of the lamp will be automatically adjusted so that the meter 7 gives substantially full scale deflection, but the amplifier will be slightly out of balance again. The amplifier is rebalanced by means of the potentiometer P3.

(c) The foregoing procedure (b) is repeated until correct calibration is achieved with the amplifier balanced.

Once this initial setting up has been completed, further adjustment should be unnecessary unless the lamp 1, or the photo-electric cell 6, is changed. When the microswitch MS1 is closed, a fall in the intensity of the transmitted light received by the cell 6, which fall may for example be due to gradual blackening with age of the glass of the lamp 1, will tend to cause a drop in the current flowing through the resistor R9 and hence a drop in the potential difference developed between the ends of R9. The input voltage signal to the base of transistor TR3, with respect to the reference line 17, will therefore tend to rise (i.e. to become less negative) so as to cause a drop in the collector currents of TR3 and TR4 and hence a drop in the output voltage of the amplifier. This tendency to drop (i.e. to become more negative with respect to the reference line 17), applied as an input to the base of TR7, tends to cause an increase in the current supplied to the lamp 1, which increase will tend to counteract the effect of the initial fall in the intensity of the light received by the cell 6.

The circuit configuration employed for the D.C. amplifier 8 gives a high input impedance which serves to reduce base current leakage from C6 when MS1 is open. The use of a higher input impedance arrangement between MS1 and the D.C. amplifier could result in further reduction of such base current leakage. As the transistors TR3, TR4, TR5 and TR6, epitaxial planar transistors would be suitable, and metal-oxide field-effect transistors could be used to give even higher input impedance.

It will be appreciated that embodiments of the invention, with appropriate calibration, can be used for the measurement of absorption (and conversely of transmission) of light or other radiation in numerous applications besides the haemoglobinometer described above.

In the haemoglobinometer described above the standard sample S1 may of course be replaced by some other form of standard radiation-absorbing device, for example a filter having an absorption equivalent to that of the standard sample. Such filter might comprise a liquid solution, or could be a glass or gelatine filter.

I claim:
1. A radiation-absorption measuring device comprising:
    (a) a radiation source for supplying radiation at a variable source output power to a sample of a substance to be investigated;
    (b) a radiation-sensitive member for receiving radiation transmitted through a sample from said source and connected for providing an electric current dependent upon the intensity of such transmitted radiation; and
    (c) means operative selectively between:
        (i) a first condition in which said means operates to stabilize the magnitude of such electric current by controlling said radiation source in dependence thereupon, and
        (ii) a second condition in which said means operates to stabilise said radiation source output power in dependence upon that value of the source output power which obtained when said means was last operating in said first condition, and in which said source output power is independent of such electric current.

2. A device according to claim 1, further comprising a meter connected to provide a visual indication of the magnitude of such electric current.

3. A device according to claim 1, wherein said means includes a D.C. amplifier having an output which is connected to control said radiation source output power.

4. A device according to claim 3, further comprising a rectifier circuit, having stabilization means, connected for supplying a stabilised working voltage for said D.C. amplifier.

5. A device according to claim 3, said D.C. amplifier having an input, further comprising an impedance connected in series with said radiation-sensitive member for carrying such electric current and thereby producing a signal which is fed to said input.

6. A device according to claim 1, wherein said radiation source comprises an electrical supply circuit having an output, and an electric lamp connected across said supply circuit output.

7. A device according to claim 6, wherein said means includes a D.C. amplifier having an input and having an output which is connected to control said radiation source output power, said device further comprising a capacitor connected between said supply circuit output and said amplifier input for stabilising said radiation source output power when said means are in said second condition.

8. A device according to claim 6, wherein said electrical supply circuit is a D.C. supply circuit including a rectifier circuit.

9. A device according to claim 6, wherein said electrical supply circuit includes a transistor connected in emitter-follower configuration, said lamp is connected as emitter load of said transistor, and control of said source output power is exercised by application of a control signal to the base of said transistor.

10. A device according to claim 6, wherein said electrical supply includes a thermionic amplifier tube connected in cathode-follower configuration, said lamp is connected as cathode load of said tube, and control of said source output power is exercised by application of a control signal to the control grid of said tube.

11. A device according to claim 1, further comprising a carrier which is movable selectively between first and second dispositions respectively to place first and second sample containers in position for transmitting radiation from said source to said radiation-sensitive member.

12. A device according to claim 11, further comprising an electrical switch, and a linkage between said carrier and said switch ensuring that when said carrier is in said first disposition said means are in said first condition and ensuring also that when said carrier is in said second disposition said means are in said second condition.

13. A device according to claim 1, wherein said radiation-sensitive member is a photo-electric cell.

14. A device according to claim 13, wherein said cell is a photo-conductive cell.

15. A device according to claim 14, further comprising a rectifier circuit, having stabilisation means, connected for supplying a stabilized working voltage for said cell.

16. A device according to claim 15, wherein said means include a D.C. amplifier having an output which is connected to control said radiation source output power, said device further comprising a second rectifier circuit, having stabilisation means, connected for supplying a stabilised working voltage for said D.C. amplifier, and a transformer having two secondary windings connected respectively to feed the two rectifier circuits.

17. A device according to claim 16, wherein said radiation source comprises an electrical supply circuit having an output, and an electric lamp connected across said supply circuit output, and wherein said electrical supply circuit is a D.C. supply circuit including a third rectifier circuit, and wherein said transformer has first, second and third secondary windings connected respectively to feed the three rectifier circuits.

18. A device according to claim 15, further comprising variable voltage-providing means operable in opposition to said rectifier circuit for adjusting such electric current.

19. A device according to claim 18, wherein said variable voltage-providing means comprises a further rectifier circuit including stabilisation means.

20. A radiation-absorption method of testing the content of a given material in a transparent matrix, comprising the steps of:
    (a) interposing between a radiation source and a radiation-sensitive member, which is connected for providing an electric current dependent upon the intensity of radiation received by said member from said source, a standard radiation-absorbing device, while stabilising the said electric current by controlling the radiation source in dependence thereupon; and (b) replacing said standard device between said radiation source and said member by a sample of the matrix having an unknown material content which is to be tested, rendering the radiation source output power independent of said electric current, stabilizing said source output power in dependence upon that value of said source output power which obtained when said radiation source was last being controlled in dependence upon said electric current, and using said electric current to provide a response which is a measure of said unknown content.

References Cited

UNITED STATES PATENTS

| | | | |
|---|---|---|---|
| 2,245,124 | 6/1941 | Bonn | 250—218 X |
| 2,649,834 | 8/1953 | Sweet | 88—14 |
| 3,031,578 | 4/1962 | Colburn | 250—205 |

JAMES W. LAWRENCE, *Primary Examiner*.

E. R. LA ROCHE, *Assistant Examiner*.

U.S. Cl. X.R.

88—14; 250—205, 43.5